(12) United States Patent
Yim et al.

(10) Patent No.: US 7,424,725 B2
(45) Date of Patent: Sep. 9, 2008

(54) OPTICAL DISK PLAYER

(75) Inventors: Hong-kyun Yim, Suwon-si (KR);
Yong-hoon Lee, Suwon-si (KR);
Jae-yong Eum, Suwon-si (KR);
Jeung-rak Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 796 days.

(21) Appl. No.: 11/032,044

(22) Filed: Jan. 11, 2005

(65) Prior Publication Data
US 2005/0177840 A1 Aug. 11, 2005

(30) Foreign Application Priority Data
Feb. 10, 2004 (KR) .................. 10-2004-0008637

(51) Int. Cl.
*G11B 17/04* (2006.01)
(52) U.S. Cl. .............. 720/608; 720/601; 720/605; 720/613; 720/615; 720/616; 720/627; 720/628; 720/647; 720/655
(58) Field of Classification Search .......... 720/601, 720/605, 608, 613, 615, 616, 627, 628, 647, 720/655
See application file for complete search history.

(56) References Cited
U.S. PATENT DOCUMENTS 5,218,593 A * 6/1993 Kaneo et al. .............. 720/608
5,381,393 A * 1/1995 Ohtani ..................... 720/604
6,335,914 B2 * 1/2002 Tanaka et al. ............. 720/608
6,404,719 B1 6/2002 Fukuyama et al.
6,480,354 B2 11/2002 Yamada et al.
7,065,772 B2 * 6/2006 Kagawa ................... 720/608

FOREIGN PATENT DOCUMENTS

JP 10255369 A * 9/1998
JP 11-39852 2/1999

OTHER PUBLICATIONS

Office Action issued on Mar. 2, 2007 by the Chinese Intellectual Property Office for Chinese Patent Application No. 200510007260.2.

* cited by examiner

*Primary Examiner*—Andrea Wellington
*Assistant Examiner*—Carlos E Garcia
(74) *Attorney, Agent, or Firm*—Stein, McEwen & Bui, LLP (57) ABSTRACT

An optical disk player with improved opening and closing of a door, transport of a tray, and an improved pivoting structure of a chassis to pivot a turntable. The optical disk player includes: a body; a tray to move in and out of the body so as to transport an optical disk; a chassis installed to pivot inside the body; an optical pickup, which is installed to be able to move back and forth in the chassis, to record/reproduce information onto/from the optical disk that is rotatably placed on the turntable; a cover installed on a front of the body, the cover including: a door holder with an aperture through which the tray moves; a door to be able to slide along the door holder so as to open and close the aperture; and a cam driving device to activate the tray, to pivot the chassis, and to open and close the door by sliding.

18 Claims, 10 Drawing Sheets

FIG. 12

OPTICAL DISK PLAYER

CROSS-REFERENCE TO RELATED APPLICATIONS

This application claims the priority of Korean Patent Application No. 2004-8637, filed on Feb. 10, 2004, in the Korean Intellectual Property Office, the disclosure of which is incorporated herein in its entirety by reference.

BACKGROUND OF THE INVENTION

1. Field of the Invention

The present invention relates to an optical disk player, and, more particularly, to an optical disk player with improved opening and closing operations of a door, and improved transport of a tray, and an improved pivoting structure of a chassis to pivot a turntable.

2. Description of the Related Art

Generally, an optical disk player records information on an optical disk by emitting light to the optical disk, which is a recording medium, or reproduces information that has been recorded on the optical disk from the optical disk.

Figure 1:
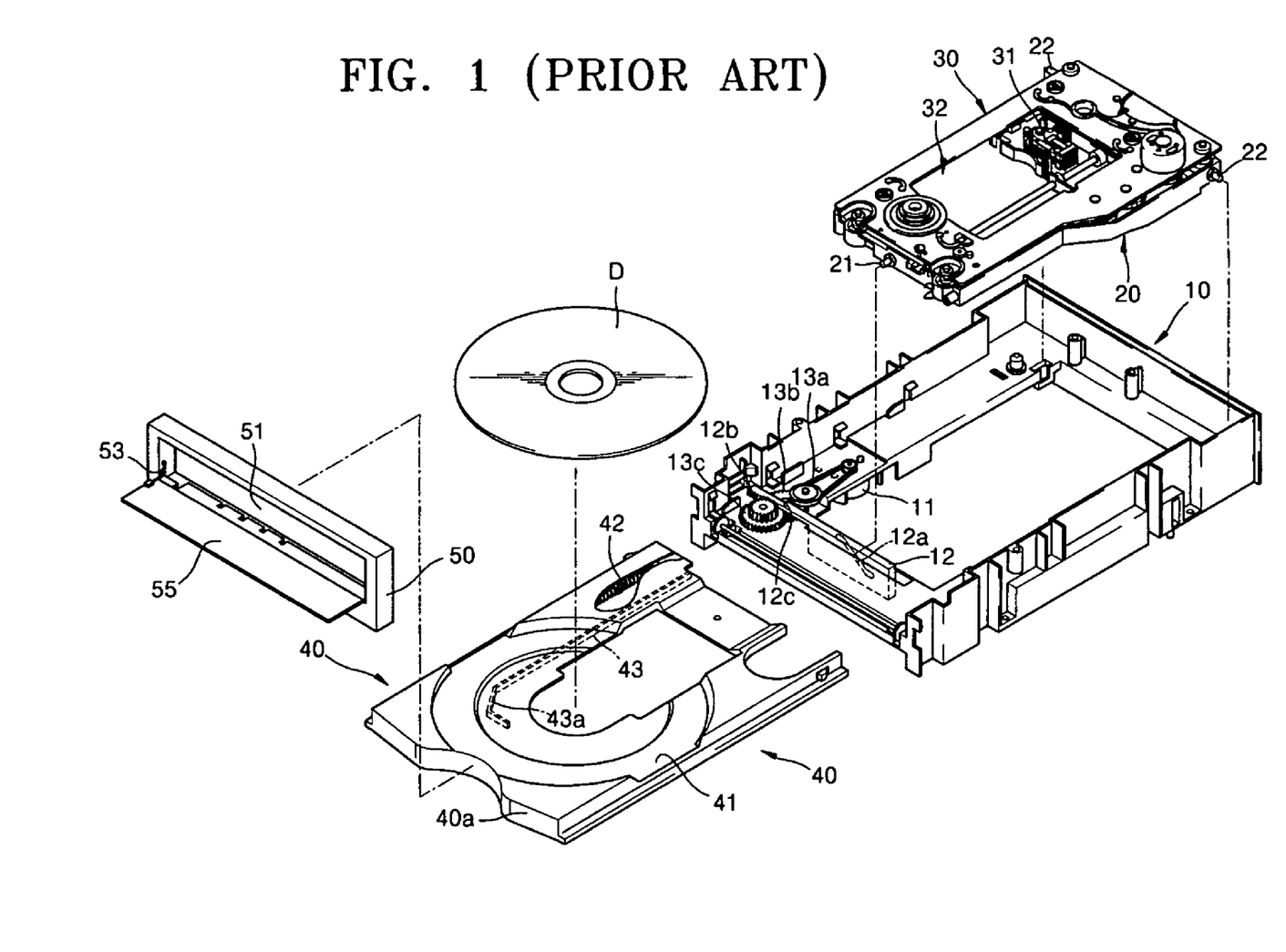
FIG. 1 is an exploded perspective view of a conventional optical disk player.

Referring to FIG. 1, a conventional optical disk player includes a body 10, a frame 20 installed within the body 10 to be able to pivot, a chassis 30 mounted on the frame 20, and a tray 40. The tray 40 includes a placing surface 41 where an optical disk D is placed. The tray 40 moves in and out of the body 10 so as to transport the optical disk D. Also, the conventional optical disk player includes a turntable 32 on which the optical disk D is placed and an optical pickup 31 that records/reproduces information on/from the optical disk D that is placed on the turntable 32. The optical pickup 31 is installed to be able to reciprocate in the chassis 30.

For a reciprocating movement of the tray 40 from the body 10, the body 10 has a loading motor 11 and power transmission units 13a through c including a belt and a plurality of intermediate gears to transmit the power of the loading motor. In addition, a rack gear 42 is placed on a bottom surface of the tray 40. Thus, power provided from the loading motor 11 is transmitted to the rack gear 42 through the power transmission units 13a through c so as to cause the tray 40 to reciprocate.

The frame 20 is installed to be able to move the body 10 up and down with a pivot 22 supported by the body 10.

To this end, a cam element 12 that is installed in the body 10 receives the power of the loading motor 11 so as to reciprocate in a sideways direction. The cam element 12 has a cam hole 12a that is slanted in a height direction in which a cam protrusion 21 of the frame 20 is inserted. Here, the cam protrusion 21 is installed in the frame 20 to be able to move up and down so that the cam element 12 is able to ascend and descend along a trajectory of the cam hole 12a. The power provided to the cam element 12 is able to be transmitted or not transmitted according to the location of the tray 140. In other words, the cam element 12 receives power only when the tray 40 is almost loaded into the body 10 or when the tray 240 is completely loaded. The power is blocked in all other instances.

To this end, a protrusion 12c is formed on the cam element 12. The protrusion 12c comes in contact with an inclined portion 43a of a guide rail 43 and slides when the tray 40 is loaded into the body 10. That is, the cam element 12 moves to one side and a gear 12b interlocks with the power transmission unit 13c as the inclined portion 43a and the protrusion 12c come in contact with each other when the tray 40 is almost completely loaded into the body 10. Accordingly, the power of the loading motor 11 that loaded the tray 40 is changed in the sliding direction of the cam element 12.

Additionally, in order to prevent, for example, dust from entering into the body 10 after the tray 40 is loaded, a cover 50 with an aperture 51 and a door 55 to pivot within the aperture are installed on the front of the body 10 where the tray 40 enters. Here, opening and closing operations of the door 55 are carried out by a cooperation between a movement of the tray 40 and a restoring force of a spring 53 that is located at one side of the cover 50. In other words, when the tray 40 is located within the body 10, the door 55 does not interfere with the tray 40 and closes the aperture 51 by the restoration force of the spring 53.

On the other hand, when unloading the tray 40, an end 40a of the tray 40 comes in contact with the inner surface of the door 55 as the tray 40 is being ejected to the outside by being driven by the loading motor 11. Accordingly, the door 55 overcomes an elastic force of the spring 53 and pivots around a hinge so as to open the aperture 51.

When the tray 40 with the optical disk D placed thereon is loaded into the body 10, the frame 20 ascends as the cam element 12 slides. Then, the optical disk D is placed on top of the turntable 32. The ejection operation of the tray 40 is carried out conversely to the previously described operation.

The door 55 remains in the opened state when the tray 40 is unloaded or being loaded. Additionally, after the loading operation is completed, the door 55 does not contact the tray 40 and the aperture 51 is closed, which prevents, for example, dust from entering into the body 10.

The conventional optical disk player has a structure in which the door 55 is closed by the restoration force of the spring 53, and the door 55 is opened by a pushing force of the tray 40. Therefore, the loading motor 11, which provides power to unload the tray, may be overloaded by the restoration force of the spring 53 and a friction between the tray 40 and the body 10 during the unloading operation. Furthermore, noise is produced when opening and closing the door 55.

In addition when the end 40a of the tray 40 is designed to be round for the convenience of placing a cartridge-type optical disk, the entire surface of the door 55 does not come in contact with one side of the tray 40 simultaneously. That is, the door 55 could bend during the opening and the closing operations because only a part of the door 55 contacts the end 40a of the tray 40.

SUMMARY OF THE INVENTION

The present invention provides an optical disk player with a structure that reduces a load that is applied to a driving source and which reduces the possibility of a bending of a door as a result of opening and closing operations of the door using power from the driving source to transport a tray and to pivot a chassis.

According to an aspect of the present invention, an optical disk player having a turntable therein includes a body; a tray to move in and out of the body so as to transport an optical disk; a chassis installed to pivot inside the body; an optical pickup to be able to move back and forth in the chassis so as to record/reproduce information onto/from the optical disk rotatably placed on the turntable; and a cover installed on a front of the body. The cover includes a door holder with an aperture through which the tray moves; a door to be able to slide along the door holder so as to open and close the aperture; and a cam driving device that activates the tray, pivots the chassis, and opens and closes the door by sliding.

The cam driving unit includes a loading motor installed inside the body; a power transmission unit to transmit power provided by the loading motor; a sliding cam driver to slide back and forth by selectively receiving power from the power transmission unit so as to guide the opening and closing of the door by sliding and the pivoting of the chassis; and a tray driving unit to drive the tray in and out of the body by selectively receiving power from the power transmission unit.

Additional and/or other aspects and advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 2:
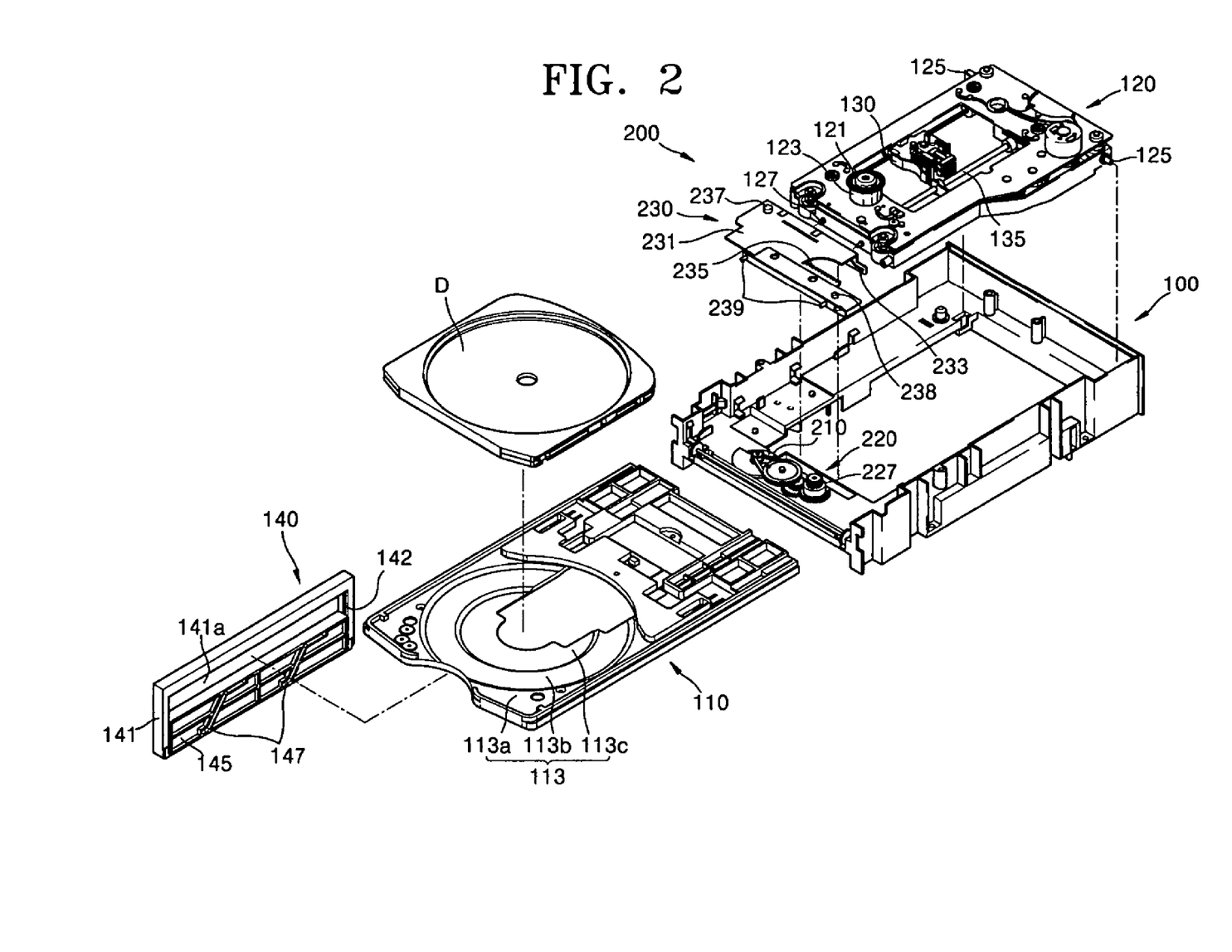
FIG. 2 is an exploded perspective view of an optical disk player according to an embodiment of the present invention.
Figure 3:
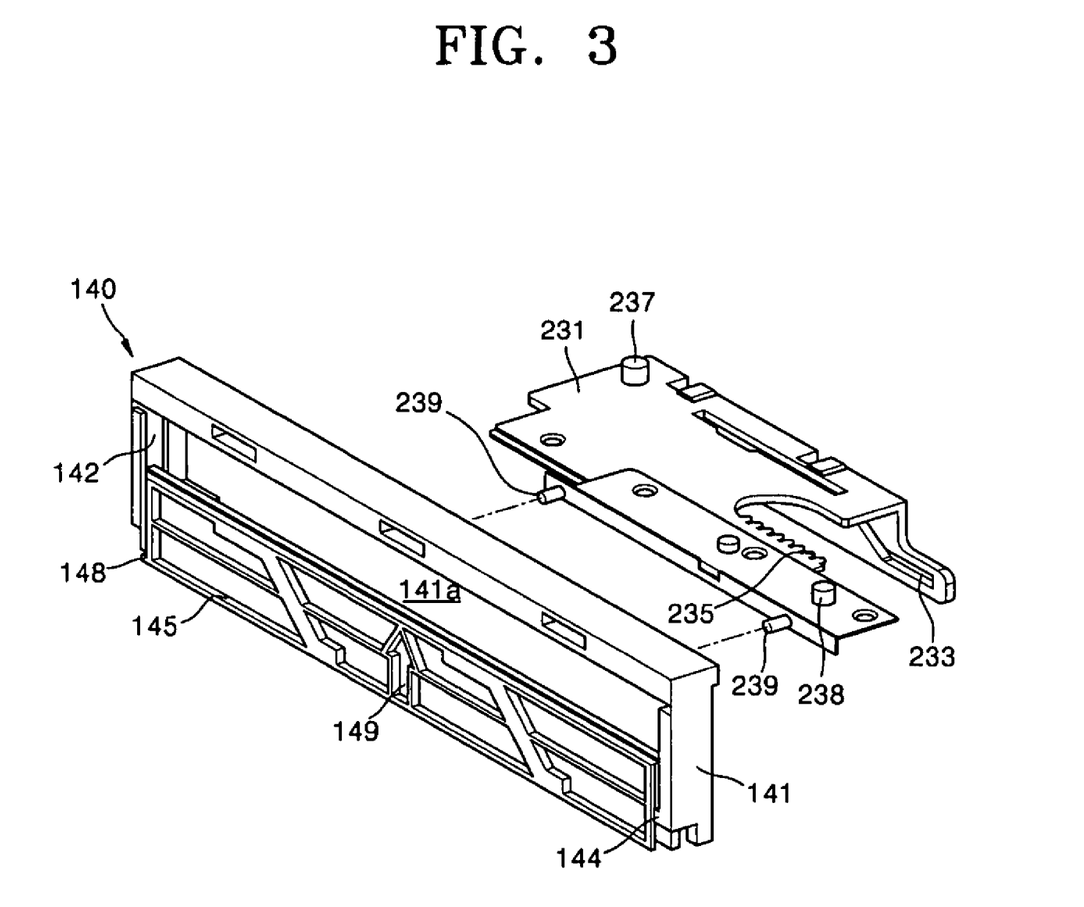
FIG. 3 is an exploded perspective view of a sliding cam and a cover of FIG. 2.
Figure 4:
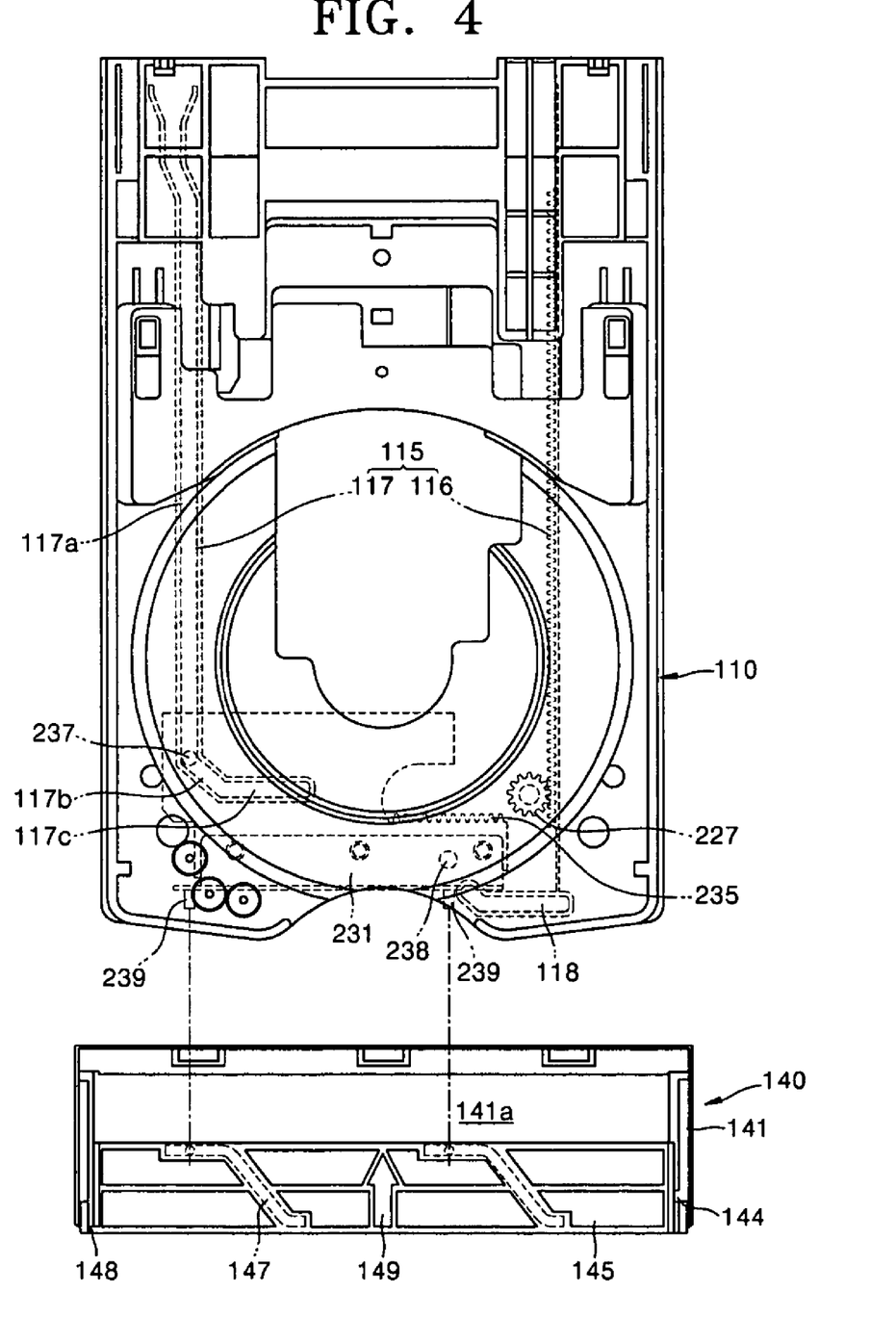
FIG. 4 is a schematic plan view of a tray, a tray driving unit, and the sliding cam of FIG. 2.

Referring to FIGS. 2 through 4, an optical disk player according to an embodiment of the present invention includes a body 100, a tray 110 to load/unload an optical disk D and to move in and out of the body 100, a chassis 120 installed to be able to pivot inside the body 100, an optical pick up 130 to record/reproduce information on/from the loaded optical disk D, and a cover 140 installed on the front of the body 100. Also, the optical disk player includes a cam driving device 200 to move the tray 110 in and out of the body 100, to pivot the chassis 120, and to open and close a door 145 by sliding. The door 145 is a part of the cover 140.

The tray 110 includes a placing surface 113 where the optical disk D is placed. The placing surface 113 has a structure in which both cartridge-type optical disks and a type of optical disks with a recording surface exposed to the outside can be accommodated. In other words, the placing surface 113 has a rectangular placing groove 113a that matches the size of the cartridge, and circular placing grooves 113b and 113c with a diameter of 120 mm and 80 mm, respectively.

The tray 110 moves between the inside and outside of the body 100 via the cam driving device 200. To this end, a tray driving unit 115, shown in FIG. 4 and acting as one feature of the cam driving device 200, is provided at one side of the tray 110, i.e., at a bottom surface of the placing surface 113. The tray driving unit 115 includes a tray rack gear 116 that reciprocates the tray 110 by receiving a driving power from a loading motor 210 and a main guide groove 117 that guides the tray 110 and converts the driving power. In addition, the tray driving unit 115 may further include a supplementary guide groove 118 formed on one side of the tray 110 which guides a sliding cam 230. The detailed structure and operation of the tray driving unit 115 will be described later.

A turntable 121 with the optical disk D transported by the tray 100 placed thereon, and the optical pickup 130 are installed on the chassis 120. The turntable 121 is installed on a rotating axis of a spindle motor 123 which provides a rotating power. The turntable 121 is rotated when recording/reproducing information on/from the optical disk D.

The optical pickup 130 is to be able to reciprocate along a guide shaft 135 that is placed in the chassis 120. The optical pickup 130 moves along a surface of the optical disk D placed on the turntable 121 in a radial direction and is guided by the guide shaft 135. The optical pickup 130 emits light to the optical disk D, receives light reflected from the optical disk D, and records/reproduces the information on/from the optical disk D. The structure and operation of the optical pickup 130 is well-known to those skilled in the art. Thus, a detailed description thereof will be omitted.

The chassis 120 is reciprocated in the body 100 via a coupling of the chassis 120 to the cam driving device 200. In other words, the chassis 120 ascends when the tray 110 has fully entered inside the body 100 to load the optical disk D to the turntable 121. In other cases, the chassis 120 descends such that the chassis does not interfere with the movement of the tray 110 that moves in and out of the body 100. To this end, the chassis 120 includes a pivot 125 coupled to a predetermined location of the body 100 to be able to pivot. The chassis 120 further includes chassis pivoting guide pins 127 to guide ascension and descension of the chassis 120. The chassis pivoting guide pins are connected to pivoting guide cam holes 233 of the sliding cam 230.

The cover 140 has a door holder 141 with an aperture 141a in which the tray 110 moves, and the door 145 installed on the door holder 141 to be able to slide on the door holder 141 to open and close the aperture 141a.

Door guide grooves 147 are formed on the one surface of the door 145 that faces the cam driving device 200. The door guide grooves 147 guide the ascension and descension of the door 145 according to the location of the cam driving device 200. Thus, at least a portion of the door guide grooves 147 is formed in a slanted direction. Consequently, the door 145 moves vertically according to a horizontal movement of the sliding cam 230. That is, the door 145 ascends to close the aperture 141a when the entrance of the tray 110 into the body 100 is completed. As a result, an entrance of foreign substances from outside the body 100 into the body 100 is prevented. In another case, the door 145 descends to open the aperture 141a according to a horizontal movement of the sliding cam 230.

The door holder 141 may include a guide rail 142 to guide the ascension and descension of the door 145. The guide rail 142 formed within the aperture 141a is coupled to the door 145 so that the door 145 is able to ascend and descend along the guide rail 142. Additionally, a stopper 144 is formed on one side of the aperture 141a of the door holder 141 to prevent an improper insertion of the door 145 when assembling the door 145 to the door holder 141, and may have a hanger sill 148 formed on at least one side of the lower portion of the door 145. Therefore, the hanger sill 148 interferes with the guide rail 142 or the stopper 144. Therefore, an improper insertion of the door 145 is prevented. Furthermore, along with the improper insertion prevention structure and/or instead of the structure, a distinguishing indicator 149 may be formed on the door 145 to illustrate an assembling direction of the door 145. Therefore, an assembly-person or an assembling machine incorrectly assembling the door 145 to the door holder 141 may be prevented from doing so by distinguishing the assembling direction with the distinguishing indicator 149.

The cam driving device 200 drives the tray 110, the chassis 120, and the door 140 with the power provided from one driving source. Of course, it is understood that this one driving source may itself comprise additional driving sources. As such, the cam driving device 200 includes the loading motor 210 and a power transmission unit 220 installed inside the body 100, the sliding cam 230 installed to be able to slide inside the body 100, and the tray driving unit 115 installed on the tray 110.

The power transmission unit 220 that is installed inside the body 100 selectively transmits power provided from the loading motor 210 to the sliding cam 230 and the tray driving unit 115.

Figure 5:
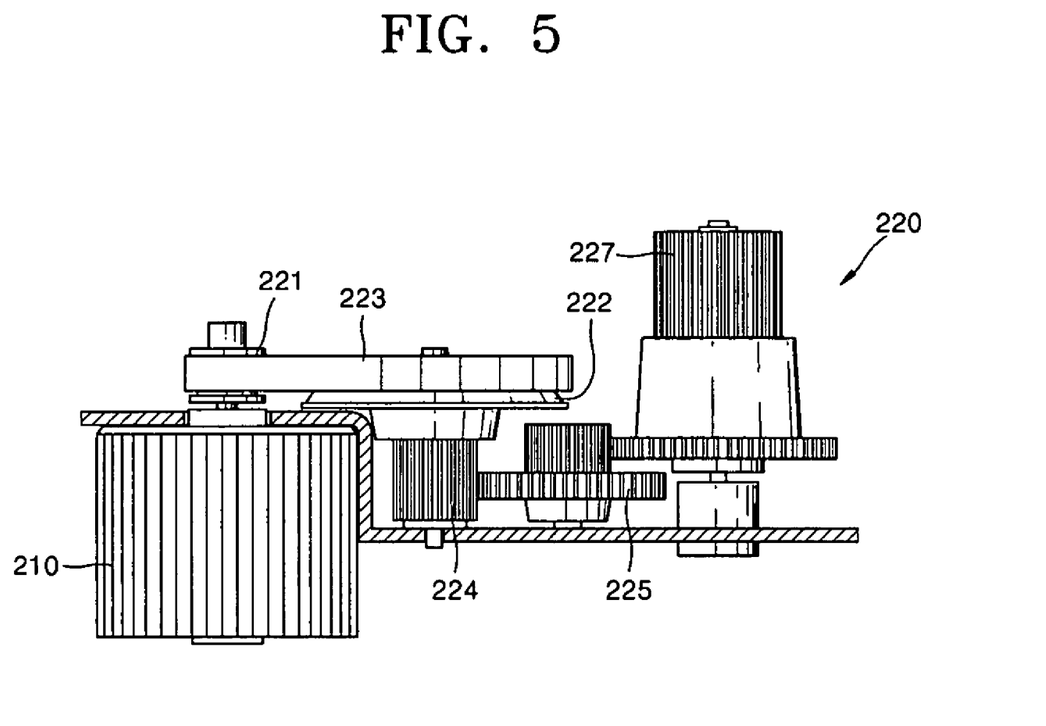
FIG. 5 is a schematic cross-sectional view of a loading motor and a power transmission unit of FIG. 2.

FIG. 5 is one example of the power transmission unit 220 with a structure that reduces and transmits power that is provided from the loading motor 210. Referring to FIG. 5, the power transmission unit 220 includes a first pulley 221 mounted on a rotating axis of the loading motor 210, a second pulley 222 with a larger diameter than the first pulley 221, a belt 223 installed between the first and second pulleys 221 and 222, intermediary gears 224 and 225 of single or double layer structure, and a pinion gear 227. Thus, the power from the loading motor 210 is transmitted to the pinion gear 227 through the belt 223 and intermediary gears 224 and 225.

As shown in FIG. 4, the pinion gear 227 selectively meshes with a sliding rack gear 235 provided at a plate of the sliding cam 230 and the tray rack gear 116 to selectively transmit power to the sliding cam 230 and the tray 110. The power transmission and interception process through the pinion gear 227 will be described later.

The power transmission unit 220 may be configured in various ways besides the one presented herein by FIG. 5. For example, having a structure where a pinion gear 227 is directly installed on the rotating axis of the loading motor 210 is possible.

The reciprocating sliding drive of the sliding cam 230 guides the opening and closing of the door 145 through sliding and the pivoting movement of the chassis 120 by selectively receiving the power from the power transmission unit 220.

Besides moving the tray 110 in and out of the body 100, the tray driving unit 115 selectively transmits the power received through the pinion gear 227 to the sliding cam 230 and the tray 110. To this end, the tray driving unit 115 includes the tray rack gear 116 to reciprocally move the tray 110, the main guide groove 117 to guide the reciprocating transport of the tray 110 and to perform power transmission, and the supplementary guide groove 118 to guide the transport of the sliding cam 230.

The main guide groove 117 guides a main guide boss 237 included in the sliding cam 230 and may be divided into a tray guide portion 117a, a clutch portion 117b, and a sliding cam transport guide portion 117c according to an arrangement structure and operation thereof.

The tray guide portion 117a is formed in line with the reciprocal transportation direction of the tray 110. The clutch portion 117b is inclined relative to the movement direction of the tray 110. Therefore, during the loading operation, i.e., when the tray 110 enters inside the body 100, the clutch portion 117b moves a sliding plate 231 horizontally towards the pinion gear 227. Accordingly, the sliding rack gear 235 meshes with the pinion gear 227 so as to transmit the power to the sliding plate 231. Here, the pinion gear 227 does not mesh with the tray rack gear 116. On the other hand, during the unloading operation, the clutch portion 117b moves the tray 110 a predetermined distance to separate the pinion gear 227 from the sliding rack gear 235, and at the same time, meshes the pinion gear 227 with the tray rack gear 116.

The sliding cam transport guide portion 117c is formed in line with the transport direction of the sliding plate 231 to guide the transport of the sliding plate 231.

The supplementary guide groove 118 is formed on one side of the tray 110 in which the main guide groove 117 is formed to assist the guide of the sliding plate 231.

The sliding cam 230 guides the opening and the closing of the door 145 by sliding and by the movement of the chassis 120. The sliding cam includes the sliding plate 231, the main guide boss 237, and door ascending/descending guide pins 239.

The sliding plate 231, installed to be able to repeatedly move vertically with respect to the movement direction of the tray 110, includes the pivoting guide cam holes 233 that guide the movement of the chassis 120 and the sliding rack gear that selectively meshes with the pinion gear 227.

Figure 10:
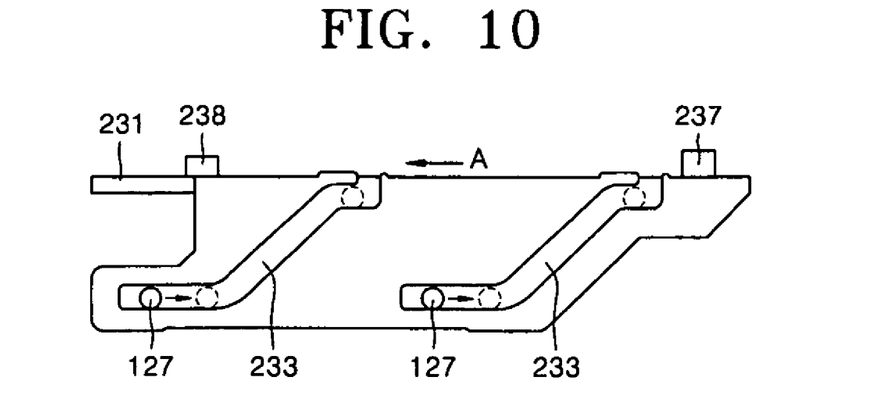
FIG. 10 is a schematic view showing a movement of chassis pivoting guide pins along pivoting guide cam holes according to a sliding of a sliding cam during the loading process.

The pivoting guide cam holes 233 are formed to face one side of the chassis 120 on a surface extended downward from one part of the top surface of the sliding plate 231. As illustrated in FIG. 10, a portion of the pivoting guide cam holes 233 is slanted. The chassis pivoting guide pins 127 are inserted into the pivoting guide cam holes 233. Thus, the vertical location of the chassis pivoting guide pins 127 is decided within the movement guide cam groove 233 according to the location of the sliding plate 231. As previously described, the chassis 120 ascends after the tray 110 is inserted into the body 100, and the chassis 120 descends in the other occasion by having the pivoting guide cam holes 233 and the chassis pivoting guide pins 127 cooperate with each other.

The sliding rack gear 235 meshes with the pinion gear 227 selectively and transforms a rotary motion of the pinion gear 227 into a straight-line motion. Thus, the sliding plate 231 may be reciprocatingly transported in a straight line by the power from the loading motor 210.

The main guide boss 237, formed on a predetermined location of the sliding plate 231, is inserted into the main guide groove 117, as previously described. Thus, when the power is changed, the pinion gear 227 is selectively meshed with the tray rack gear 116 or the sliding rack gear 235 as a result of an interaction of the main guide boss 237 with the clutch portion 117b.

The door ascending/descending guide pins 239, formed in a protrusion on the one side of the sliding plate 231 that faces the door 145, are coupled to the door guide grooves 147 to guide the ascent and descent of the door 145. That is, the door ascending/descending guide pins 239 cause the door 145 to ascend or descend according to the horizontal movement of the sliding plate 231.

The supplementary guide boss 238, formed in a protrusion on the one side of the sliding plate 231 that faces the tray 110, is inserted into the supplementary guide groove 118 to guide the transport of the tray 110.

Below, loading and unloading operations of the optical disk player according to the embodiment of the present invention will be described with reference to FIGS. 6 through 12.

Figure 6:
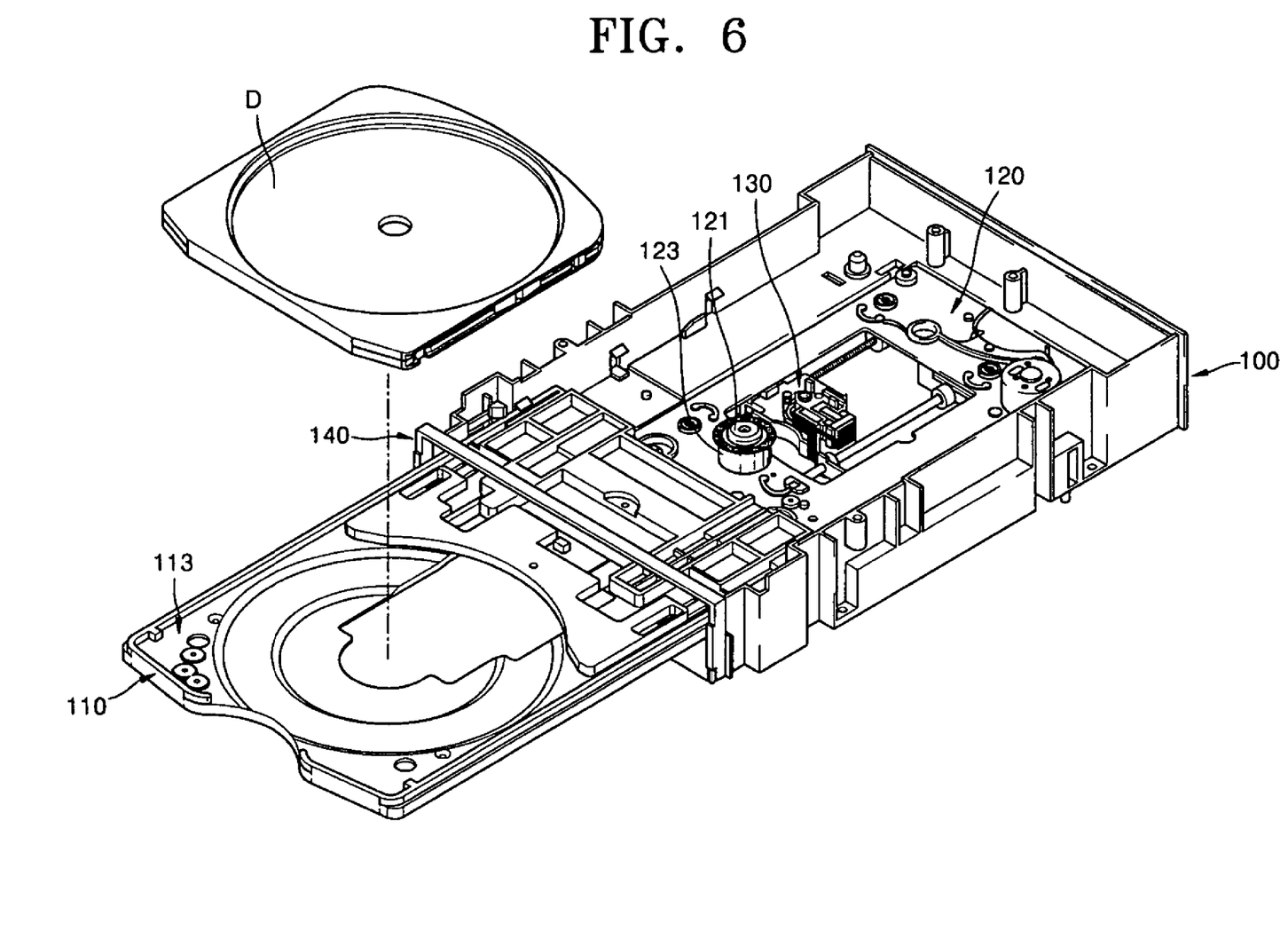
FIG. 6 is a perspective view of an unloaded state of the optical disk player according to the embodiment of the present invention.

Referring to FIG. 6, the operation of placing the optical disk D is performed when the door 145 is completely opened and the tray 110 is completely outside the body 100 while the chassis 120 descends. In this case, the placing surface 113 of the tray 110 is exposed to the outside and the optical disk D inside an optical cartridge or an optical disk without the optical cartridge (not shown) to record and reproduce information is placed on the placing surface 113. Here, the pinion gear 227 is meshed with one part of the tray rack gear 116. In addition, the main guide boss 237 is placed at an end of the tray guide portion 117a that is opposite the leading edge of the tray when the tray is unloaded from the body 100.

When performing loading in this current state, the power from the loading motor 210 rotates the pinion gear 227 through the power transmission unit 220. The tray 220 moves into the body 100 when the power is transmitted to the tray 110 through the tray rack gear 116, as illustrated in FIG. 7.

Figure 7:
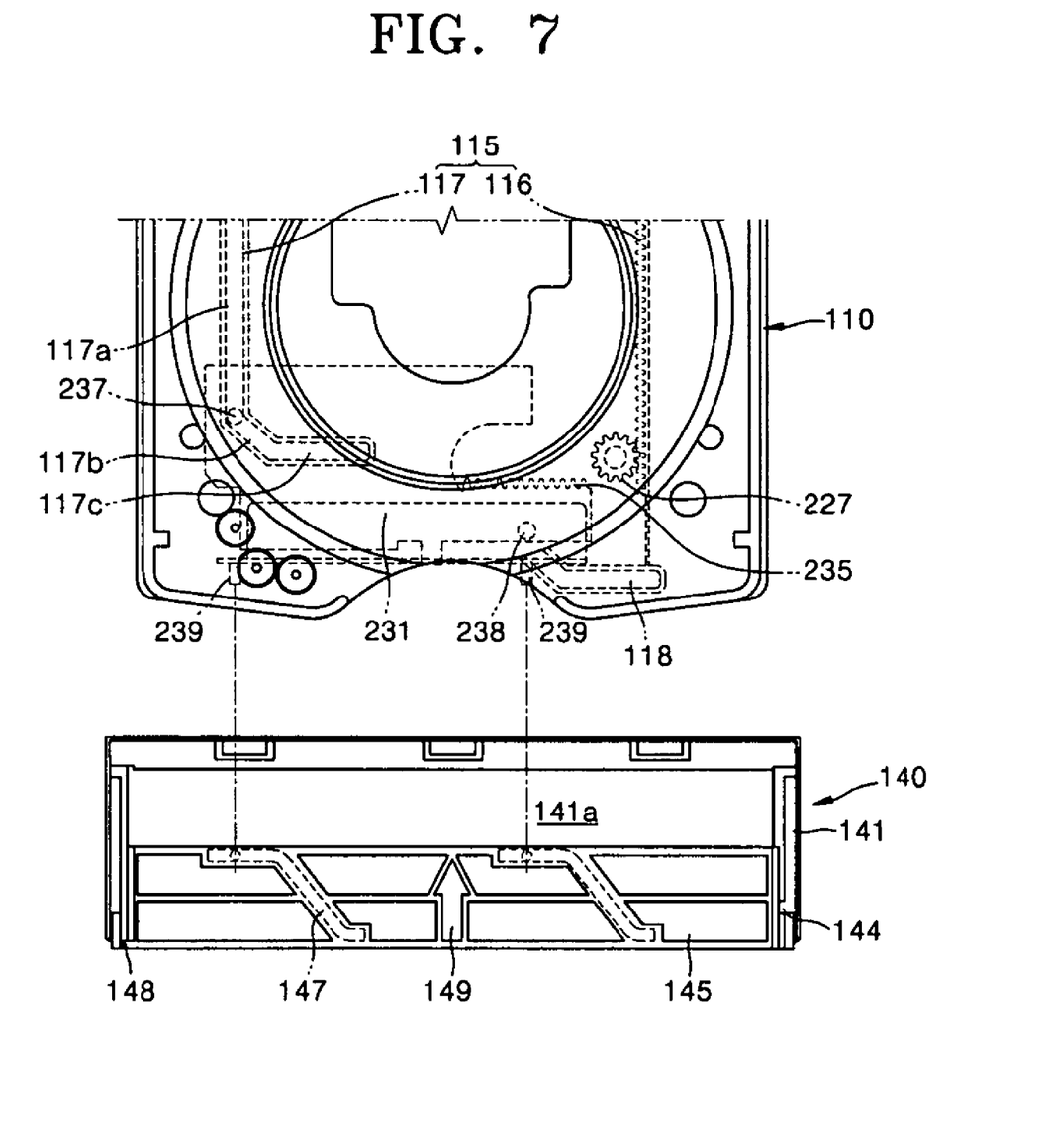
FIGS. 7 through 9 are schematic plan views of a part of the tray and the cover to explain a loading process from the state shown in FIG. 6.

Referring to FIG. 7, as the tray 110 continues to load into the body 100, the main guide boss 237 meets with the clutch portion 117b of the tray guide portion 177a. At this time, the sliding plate 231 does not move because the sliding rack gear 235 remains separated from the pinion gear 227. Consequently, the door 145 remains opened, and the chassis 129 remains descended.

Figure 8:
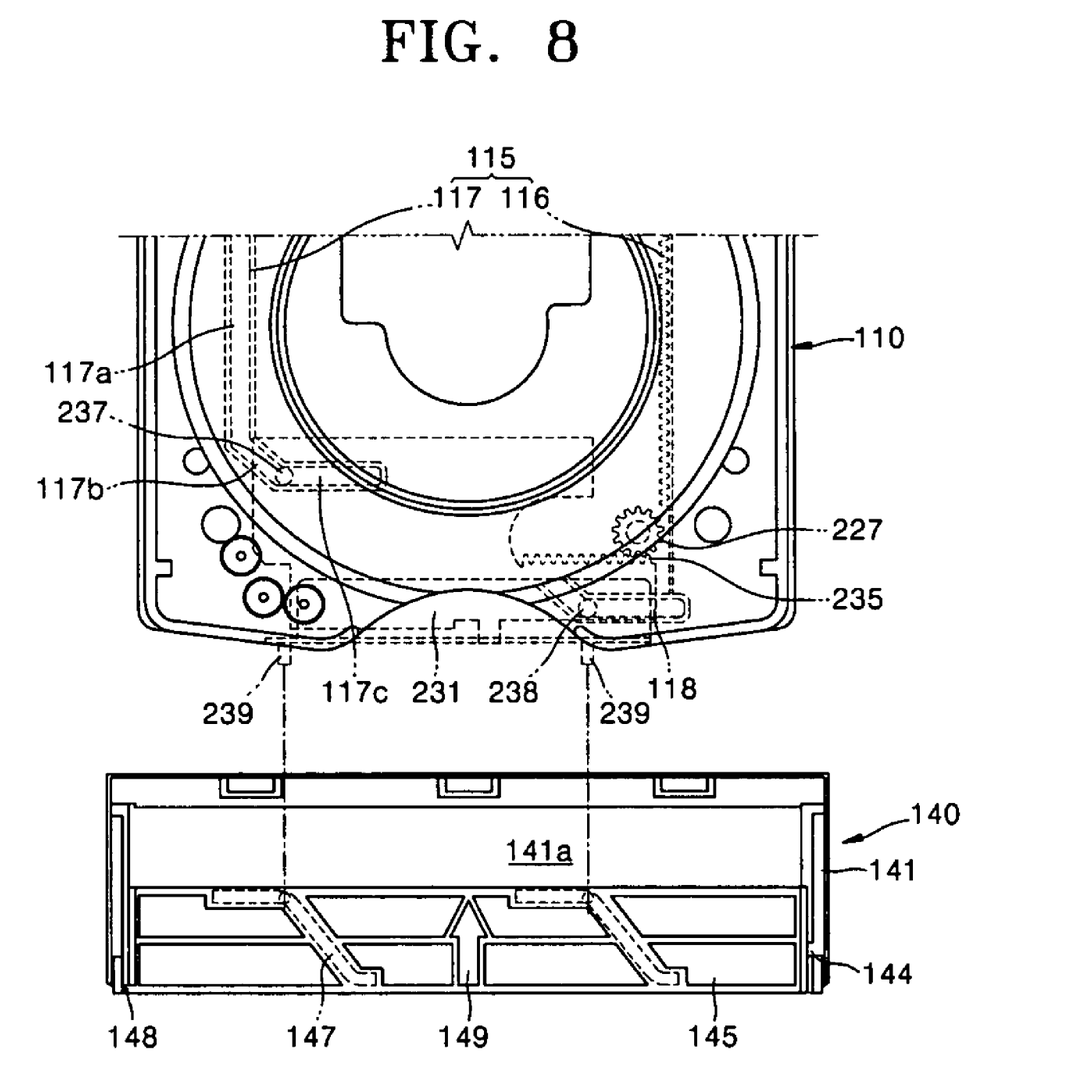

The main guide boss 237 continues to enter the clutch portion 117b while the tray 110 continually moves, as illustrated in FIG. 8. Here, the main guide boss 237 receives a force in a vertical direction while being restricted in the moving direction of the tray 110 as a result of contact between the slanted side of the clutch portion 117b and the main guide boss. Through this force, the sliding rack gear 235 is forced to mesh with the pinion gear 227 as the sliding plate 231 moves. Here, a continued movement of the tray 110 releases the meshing of the tray rack gear 116 and the pinion gear 227.

Figure 11:
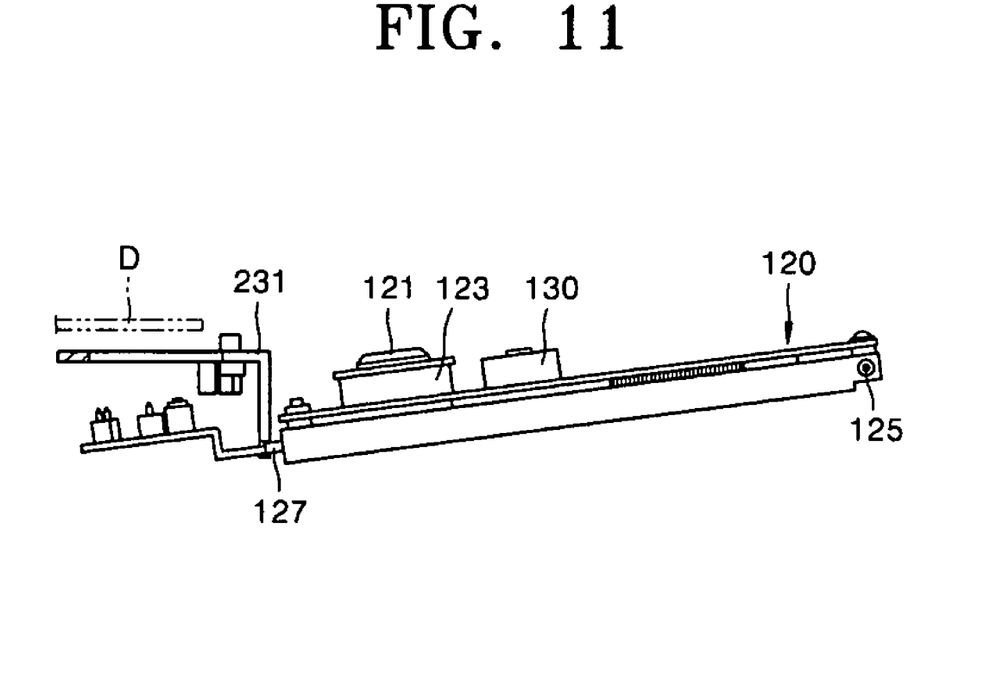
FIG. 11 is a schematic front view showing an arrangement of a chassis in the unloaded state.

As such, when the main guide boss 237 moves as necessary under the guidance of the clutch portion 117b, the chassis pivoting guide pins 127 move through the horizontal portion of the pivoting guide cam holes 233, as illustrated in FIG. 10. Thus, the chassis 120 maintains a descension pivoting state as illustrated in FIG. 11.

Also, the door ascending/descending guide pins 239 move through the horizontal portions of the door guide grooves 147, as illustrated in FIG. 8. Thus, the door 145 still remains opened.

Figure 9:
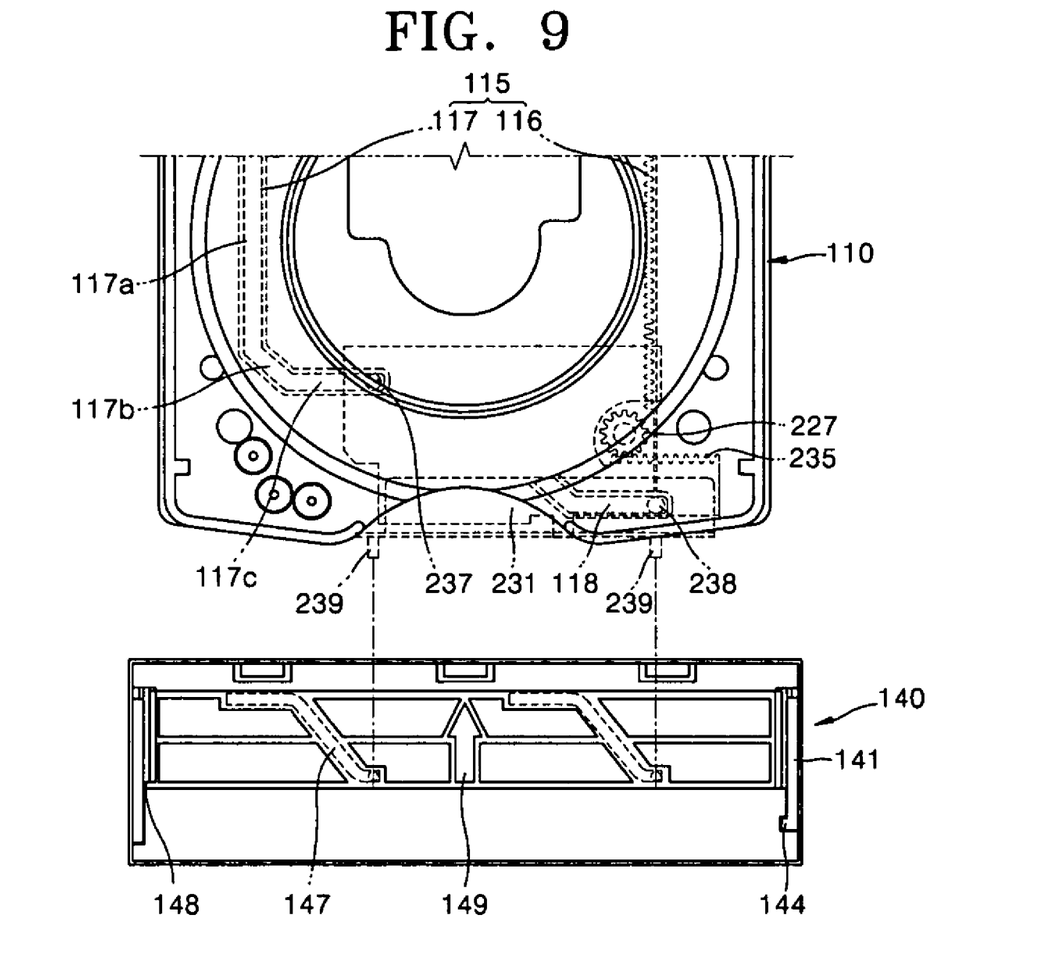

FIG. 9 shows the completed loading operation. Referring to FIG. 9, once the main guide boss 237 has passed the clutched portion 117b and entered the sliding cam transport guide portion 117c, the meshing of the pinion gear 227 to the tray rack gear 116 is released. Thus, the tray 110 is inside the body 100. In this case, the pinion gear 227 is meshed with the sliding rack gear 235 and the sliding plate 231 moves to the right direction, as shown in FIG. 9 after receiving the power of the loading motor 210.

Figure 12:
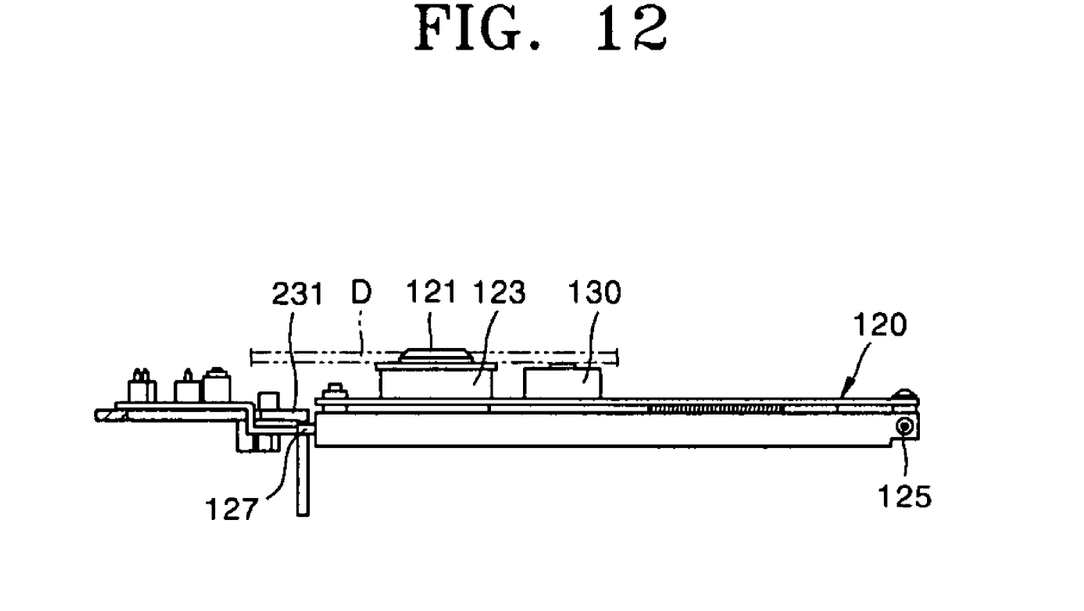
FIG. 12 is a schematic front view showing an arrangement of the chassis in a loaded state.

In this case, the chassis pivoting guide pins 127, as shown in FIG. 10, moves in the slanted portion of the pivoting guide cam holes 233. In other words, when the sliding plate 231 moves in the direction of arrow "A" shown in FIG. 10, the chassis 120 moves upward because the chassis 120 is restricted on the other side. Thus, as illustrated in FIG. 12, the turntable 121 installed on the chassis 120 ascends as the chassis 120 pivots upward with the pivot 125 as a center. Accordingly, the optical disk D is distanced from the placing surface 113 as the optical disk D placed on the placing surface 113 is located above the turntable 121. The optical disk D placed on the turntable 121 rotates as a result of the rotating force of the spindle motor 123. Here, the bottom surface of an optical disk that is mounted in a cartridge type on the tray 110 is exposed by a shutter opener (not shown) that opens a shutter of the cartridge and placed on the turntable 121. As such, the optical pickup 130 moves in the radius direction of the optical disk D along the guide shaft 135 (see FIG. 2) and performs recording/reproducing of information of the optical disk D while the optical disk D is placed on the turntable 121.

Additionally in this case, the door ascending/descending guide pins 239 move through the slanted portions of the door guide grooves 147, as illustrated in FIG. 9. Here, the door 145 closes the aperture 141a by ascending along the guide rail 142 because the other side of the door 145 is restricted. Therefore, by closing the aperture 141a, an entry of foreign substances inside the body 100 while the optical disk player is operating is prevented.

The unloading operation as illustrated in FIG. 6 from the current loading state is performed in reverse to the previously described loading operation.

An optical disk player according to the present invention transformed an opening and closing operations of a door installed on a cover into a sliding type, and opens and closes the door using power from a loading motor involved in transporting a tray and pivoting a chassis on which a turntable installed.

Therefore, compared to the conventional optical disk player with a pivoting type door that pivots to open and close the door by contacting a tray and a restoring force of a spring, the present invention has an advantage that load applied to the loading motor when loading and noise may be reduced. In addition, less overall space is needed because a separate space to open and close the door is not required. Also, a possibility that the door would be bent may be fundamentally prevented by opening and closing the door using a sliding-type of door.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An optical disk player having a turntable comprising:
   a body;
   a tray to move in and out of the body so as to transport an optical disk;
   a chassis installed to pivot inside the body;
   an optical pickup, which is installed to be able to move back and forth in the chassis, to record/reproduce information onto/from the optical disk that is rotatably placed on the turntable;
   a cover installed on a front of the body, the cover including:
      a door holder with an aperture through which the tray moves;
      a door to be able to slide along the door holder so as to open and close the aperture; and
      a cam driving device to activate the tray, to pivot the chassis, and to open and close the door by sliding.

2. The optical disk player of claim 1, wherein the cam driving device comprises:
   a loading motor installed inside the body;
   a power transmission unit to transmit power provided by the loading motor;

a sliding cam driven to slide back and forth by selectively receiving power from the power transmission unit so as to guide the opening and closing of the door by sliding and by the pivoting of the chassis; and a tray driving unit to drive the tray in and out of the body by selectively receiving power from the power transmission unit.

3. The optical disk player of claim 2, wherein the tray driving unit comprises:

a tray rack gear placed on one side of the tray to selectively mesh with the power transmission unit; and a main guide groove formed on one side of the tray to guide the transport of the tray and change the power.

4. The optical disk player of claim 3, wherein the main guide groove comprises:

a guide portion formed in line with the transport direction of the tray;

a clutch portion to guide the sliding cam to be selectively meshed with the power transmission unit; and a sliding cam transport guide portion formed in line with the transport direction of the sliding cam.

5. The optical disk player of claim 3, wherein the sliding cam comprises:

a sliding plate including:
a pivoting guide cam hole to guide the pivoting of the chassis, and
a sliding rack gear to mesh with the power transmission unit so as to receive the power; and a main guide boss, which is formed on the one side of the sliding plate that faces the tray, to guide the sliding plate according to a relative location of the tray while being coupled to the main guide groove.

6. The optical disk player of claim 5, wherein the chassis comprises:

a pivot coupled to the body; and a chassis pivoting guide pin, formed on the one side of the sliding plate that faces the sliding plate, that is coupled to the pivoting guide cam hole and ascends and descends along the pivoting guide cam hole according to the location of the sliding plate.

7. The optical disk player of claim 5, wherein the tray driving unit further comprises a supplementary guide groove to guide the sliding cam; wherein the sliding cam further comprises a supplementary guide boss, formed on the one side of the sliding plate that faces the tray, and which is inserted into the supplementary guide groove to guide the transport of the tray.

8. The optical disk player of claim 5, wherein the power transmission unit comprises a pinion gear that is rotatably installed on the body so as to be able to rotate by the power from the loading motor that meshes selectively to the tray rack gear and the sliding rack gear, wherein the pinion gear transmits power selectively to the tray and the sliding cam.

9. The optical disk player of claim 3, wherein the sliding cam comprises:

a sliding plate including a sliding rack gear to receive the power by meshing with the power transmission unit;

a main guide boss, formed on the one side of the sliding plate that faces the sliding plate, to guide the sliding plate according to a relative location of the tray; and a door ascending/descending guide pin, formed on the one side of the sliding plate that faces the door, to guide the ascent and descent of the door.

10. The optical disk player of claim 9, wherein:

the tray driving unit further comprises a supplementary guide groove to guide the sliding cam, and the sliding cam further comprises a supplementary guide boss, formed on the one side of the sliding plate that faces the tray, to be inserted into the supplementary guide groove to guide the transport of the tray.

11. The optical disk player of claim 9, wherein:

the power transmission unit comprises a pinion gear rotatably installed on the body to be able to rotate by the power from the loading motor that selectively meshes to the tray rack gear and the sliding rack gear, and the pinion gear selectively transmits power to the tray and the sliding cam.

12. The optical disk player of claim 9, wherein the door comprises a door guide groove of which at least a portion of the door guide groove facing the door ascending/descending guide pin is slanted to be coupled to the ascending and descending guide pin so as to guide the ascent and descent of the door according to the location of the sliding plate.

13. The optical disk player of claim 12, wherein:

the tray driving unit further comprises a supplementary guide groove to guide the sliding cam; and the sliding cam further comprises a supplementary guide boss, formed on the one side of the sliding plate that faces the tray to be inserted into the supplementary guide groove to guide the transport the tray.

14. The optical disk player of claim 12, wherein:

the power transmission unit comprises a pinion gear rotatably installed on the body to be able to rotate by the power from the loading motor that selectively meshes to the tray rack gear and the sliding rack gear, and the pinion gear transmits power selectively to the tray and the sliding cam.

15. The optical disk player of claim 1, wherein the door comprises a door guide groove, formed on the one side of the door that faces the cam driving device, at least a portion of the door guide groove being slanted so as to guide the ascent and descent according to the location of the cam driving device.

16. The optical disk player of claim 15, further comprising:

a stopper formed on one side of the aperture; and an intercepting sill formed on at least one side of a bottom of the door, wherein an improper insertion of the door with respect to the door holder may be prevented.

17. The optical disk player of claim 15, wherein the door holder formed inside the aperture comprises a guide rail that is coupled to the door to be able to ascend and descend the door.

18. The optical disk player of claim 17, further comprising:

a stopper formed on one side of the aperture; and an intercepting sill formed on at least one side of a bottom of the door, wherein an improper insertion of the door with respect to the door holder can be prevented.

* * * * *